US012794181B2

(12) United States Patent
Hirano

(10) Patent No.: US 12,794,181 B2
(45) Date of Patent: Nov. 10, 2026

(54) ANGLE-TYPE CONNECTOR

(71) Applicant: Japan Aviation Electronics Industry, Limited, Tokyo (JP)

(72) Inventor: Tomoyuki Hirano, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 323 days.

(21) Appl. No.: 18/740,238

(22) Filed: Jun. 11, 2024

(65) Prior Publication Data

US 2025/0038441 A1 Jan. 30, 2025

(30) Foreign Application Priority Data

Jul. 28, 2023 (JP) ................................ 2023-123475

(51) Int. Cl.

| | |
|---|---|
| ***H01R 13/646*** | (2011.01) |
| ***H01R 13/04*** | (2006.01) |
| ***H01R 13/41*** | (2006.01) |
| ***H01R 13/6474*** | (2011.01) |
| ***H01R 24/44*** | (2011.01) |
| ***H01R 24/50*** | (2011.01) |
| *H01R 12/72* | (2011.01) |
| *H01R 103/00* | (2006.01) |

(52) U.S. Cl.

CPC ......... *H01R 13/6474* (2013.01); *H01R 13/04* (2013.01); *H01R 13/41* (2013.01); *H01R 24/44* (2013.01); *H01R 24/50* (2013.01); *H01R 12/724* (2013.01); *H01R 2103/00* (2013.01)

(58) Field of Classification Search

CPC .... H01R 13/6474; H01R 13/41; H01R 13/04; H01R 24/44; H01R 24/50

USPC ............................... 439/607.35, 607.56, 581

See application file for complete search history.

(56) References Cited

U.S. PATENT DOCUMENTS 5,011,415 A * 4/1991 Suzuki .................. H01R 24/50 439/63
5,904,578 A * 5/1999 Kubota .................. H01R 24/46 439/63

(Continued)

FOREIGN PATENT DOCUMENTS

CN 106785614 A * 5/2017 ............. H01R 24/40
CN 107069353 A * 8/2017 ........... H01R 13/502

(Continued)

*Primary Examiner* — Marcus E Harcum

(74) *Attorney, Agent, or Firm* — MUNCY, GEISSLER, OLDS & LOWE, P.C.

(57) ABSTRACT

An angle-type connector includes a contact made of a metal sheet punched out in an L shape and a housing retaining the contact, the contact having a press-fitting portion linearly extending along a fitting axis and press-fitted into the housing, a contacting portion linearly extending along the fitting axis from a tip end of the press-fitting portion, and a lead portion extending from a base end of the press-fitting portion along an intersecting direction intersecting the fitting axis, a width of the lead portion in a direction orthogonal to the intersecting direction being wider than a width of the contacting portion and a width of the press-fitting portion in a direction orthogonal to the fitting axis, the lead portion including a press-fitting force receiving surface situated on the fitting axis, the contact including an impedance adjusting portion formed by cutting out in a direction along the fitting axis.

9 Claims, 7 Drawing Sheets

(56) References Cited

U.S. PATENT DOCUMENTS

| | | | | |
|---|---|---|---|---|
| 6,257,927 | B1 * | 7/2001 | Suzuki | H01R 24/50<br>439/607.05 |
| 6,343,951 | B1 * | 2/2002 | Ono | H01R 13/658<br>439/571 |
| 6,358,100 | B1 * | 3/2002 | Watanabe | H01R 13/41<br>439/733.1 |
| 8,721,353 | B2 * | 5/2014 | Xu | H01R 24/76<br>439/108 |
| 9,812,823 | B2 * | 11/2017 | Kawakami | H01R 12/724 |
| 10,164,384 | B2 * | 12/2018 | Maruyama | H01R 12/00 |
| 10,566,727 | B2 * | 2/2020 | Huang | H01R 13/428 |
| 10,700,461 | B2 * | 6/2020 | Suzuki | H01R 13/6592 |
| 10,854,999 | B1 * | 12/2020 | Price | H01R 13/659 |
| 11,764,525 | B2 * | 9/2023 | Endo | H01R 13/24<br>439/578 |
| 11,855,394 | B2 * | 12/2023 | Blakborn | H01R 13/6474 |
| 12,531,372 | B2 * | 1/2026 | Wang | H01R 12/7088 |
| 2005/0101166 | A1 * | 5/2005 | Kameyama | H01R 24/44<br>439/79 |
| 2009/0209119 | A1 * | 8/2009 | Tanaka | H01R 13/4223<br>439/78 |
| 2013/0129284 | A1 * | 5/2013 | Torikai | G02B 6/3807<br>385/75 |
| 2013/0303028 | A1 * | 11/2013 | Oka | H01R 12/70<br>439/626 |
| 2014/0080362 | A1 * | 3/2014 | Sato | H01R 13/502<br>439/701 |
| 2015/0280336 | A1 * | 10/2015 | Itou | H01M 50/505<br>439/625 |
| 2018/0366870 | A1 * | 12/2018 | Miyazawa | H01R 13/50 |
| 2020/0220305 | A1 * | 7/2020 | Hashimoto | H01R 13/04 |
| 2023/0030972 | A1 * | 2/2023 | Yamada | H01R 12/724 |
| 2023/0208070 | A1 * | 6/2023 | Isoda | H01R 13/514<br>439/701 |
| 2023/0318221 | A1 * | 10/2023 | Shimauchi | H01R 13/405<br>439/157 |
| 2024/0405475 | A1 * | 12/2024 | Zhang | H01R 13/6581 |

FOREIGN PATENT DOCUMENTS

| | | | | |
|---|---|---|---|---|
| JP | 08273729 A | * | 10/1996 | |
| JP | 2008123873 A | * | 5/2008 | |
| JP | 2013037928 A | | 2/2013 | |
| JP | 2016219101 A | * | 12/2016 | H01R 12/716 |
| JP | 202377187 A | | 6/2023 | |

* cited by examiner

ANGLE-TYPE CONNECTOR

BACKGROUND OF THE INVENTION

The present invention relates to an angle-type connector, particularly to a connector that is to be fitted to a counter connector along a fitting axis.

Conventionally, a connector that is mounted on a substrate and is to be fitted to a counter connector along a fitting axis parallel to a mounting surface of the substrate has been used. For example, JP 2023-77187 A discloses a so-called angle-type connector including an upper contact 1 and a lower contact 2 that are bent, as shown in FIG. 13. The upper contact 1 and the lower contact 2 are accommodated in insulating and cylindrical housings 3 and 4, respectively. Further, the housings 3 and 4 are accommodated in conductive and cylindrical shells 5 and 6, respectively. In addition, the angle-type connector is mounted on a substrate 7.

As shown in FIG. 14, the upper contact 1 is formed of a metal sheet having a substantially L shape and includes: a horizontally extending portion 1A linearly extending in a fitting direction in which the angle-type connector is fitted to a counter contact; a contacting portion 1B linearly extending frontward along the fitting direction from a tip of the horizontally extending portion 1A; a downwardly extending portion 1C linearly extending downward from a rear end of the horizontally extending portion 1A; and a mounting portion 1D protruding downward from a lower end of the downwardly extending portion 1C and to be connected to a corresponding circuit pattern of the substrate 7.

The horizontally extending portion 1A is press-fitted into an insertion hole 3A of the housing 3 until the downwardly extending portion 1C abuts the housing 3, whereby the upper contact 1 is retained by the housing 3.

As with the upper contact 1, also the lower contact 2 includes: a horizontally extending portion 2A; a contacting portion 2B; a downwardly extending portion 2C; and a mounting portion 2D, and the horizontally extending portion 2A is press-fitted into an insertion hole 4A of the housing 4 until the downwardly extending portion 2C abuts the housing 4, whereby the lower contact 2 is retained by the housing 4.

Further, in the connector described in JP 2023-77187 A, a bulging portion 1E and a bulging portion 2E that bulge rearward are formed in the downwardly extending portion 1C of the upper contact 1 and the downwardly extending portion 2C of the lower contact 2, respectively, thereby adjusting the characteristic impedance of the connector. The characteristic impedance of the connector can be adjusted by changing bulging lengths of the bulging portions 1E and 2E; when the bulging lengths of the bulging portions 1E and 2E that extend rearward increase, the characteristic impedance decreases, and conversely, when the bulging lengths of the bulging portions 1E and 2E decrease, the characteristic impedance increases.

However, since the bulging portions 1E and 2E formed to adjust the characteristic impedance of the connector are situated at positions displaced downward from the horizontally extending portions 1A and 2A, which are press-fitted into the insertion holes 3A and 4A of the housings 3 and 4, toward the mounting portions 1D and 2D, when the upper contact 1 and the lower contact 2 are pushed from the rear to the front with respect to the housings 3 and 4 by means of a tool for example, the upper contact 1 and the lower contact 2 become unstable in position, so that the upper contact 1 and the lower contact 2 are not easily press-fitted.

In other words, with the connector of JP 2023-77187 A, it is impossible to achieve both adjustment of characteristic impedance and facilitation of assembling, disadvantageously.

SUMMARY OF THE INVENTION

The present invention has been made to overcome such a conventional problem and is aimed at providing an angle-type connector that can achieve both adjustment of characteristic impedance and facilitation of assembling.

An angle-type connector according to the present invention is one to be fitted to a counter connector along a fitting axis, the angle-type connector comprising:

at least one contact made of a metal sheet punched out in an L shape;

a housing that has an insulating property and retains the at least one contact; and a shell that has a conductive property, is retained by the housing, and surrounds the at least one contact, wherein each of the at least one contact includes

- a press-fitting portion that linearly extends along the fitting axis and is press-fitted into the housing,
- a contacting portion that linearly extends along the fitting axis from a tip end of the press-fitting portion and is to be connected to a counter contact of the counter connector when the angle-type connector is fitted to the counter connector,
- a lead portion extending from a base end of the press-fitting portion along an intersecting direction intersecting the fitting axis, and
- a mounting portion protruding from a tip of the lead portion in the intersecting direction, a width of the lead portion in a direction orthogonal to the intersecting direction is wider than a width of the contacting portion and a width of the press-fitting portion in a direction orthogonal to the fitting axis, the lead portion includes a press-fitting force receiving surface situated on the fitting axis and facing in an opposite direction from the contacting portion, and each of the at least one contact includes an impedance adjusting portion situated between the press-fitting force receiving surface and the mounting portion and formed by cutting out, in a direction along the fitting axis, part of the lead portion at a position away from the fitting axis in a direction orthogonal to the fitting axis.

DETAILED DESCRIPTION OF THE INVENTION

Embodiments of the present invention are described below based on the accompanying drawings.

Embodiment 1

Figure 1:
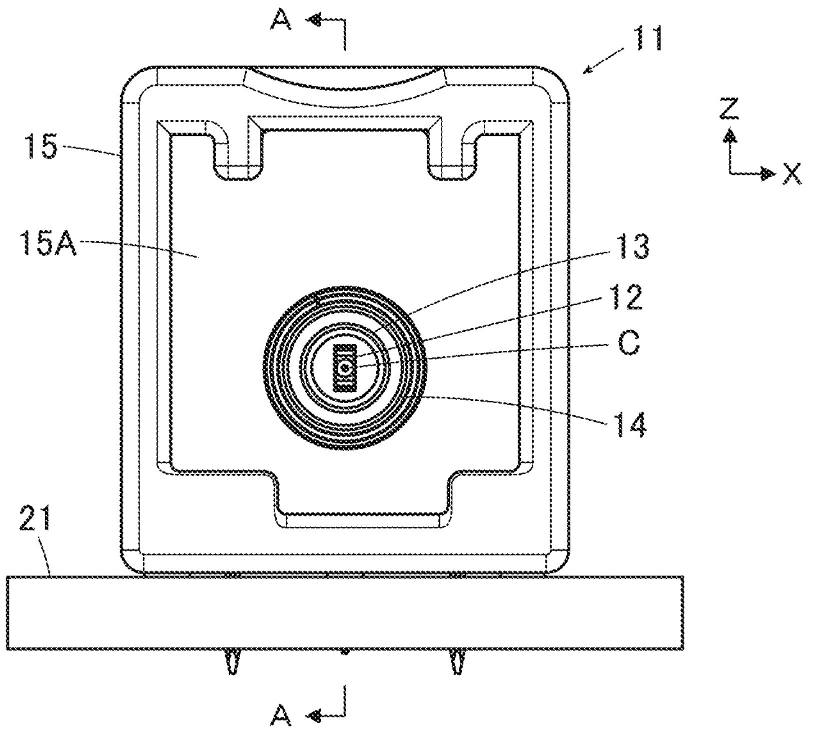
FIG. 1 is a front view showing an angle-type coaxial connector according to Embodiment 1 mounted on a substrate.

FIG. 1 shows an angle-type coaxial connector 11 according to Embodiment 1 mounted on a substrate 21. The angle-type coaxial connector 11 is to be fitted to a counter connector (not shown) along a fitting axis C and includes one contact 12, an internal insulator 13 that surrounds the contact 12, a conductive shell 14 that surrounds the internal insulator 13, and an external insulator 15 that surrounds the shell 14.

The external insulator 15 includes a counter connector accommodating portion 15A of recess shape in which part of a counter connector is to be inserted and accommodated when the angle-type coaxial connector 11 is fitted to the counter connector, and part of each of the contact 12, the internal insulator 13, and the shell 14 is exposed to the inside of the counter connector accommodating portion 15A.

The angle-type coaxial connector 11 is mounted on the substrate 21 while the external insulator 15 is disposed on a surface of the substrate 21.

For convenience, the surface of the substrate 21 is defined as extending along an XY plane, the direction in which part of a counter connector (not shown) is inserted into the counter connector accommodating portion 15A of the external insulator 15 is referred to as "+Y direction," and the direction perpendicular to the surface of the substrate 21 is referred to as "Z direction." The Y direction is a direction in which the fitting axis C extends.

Figure 2:
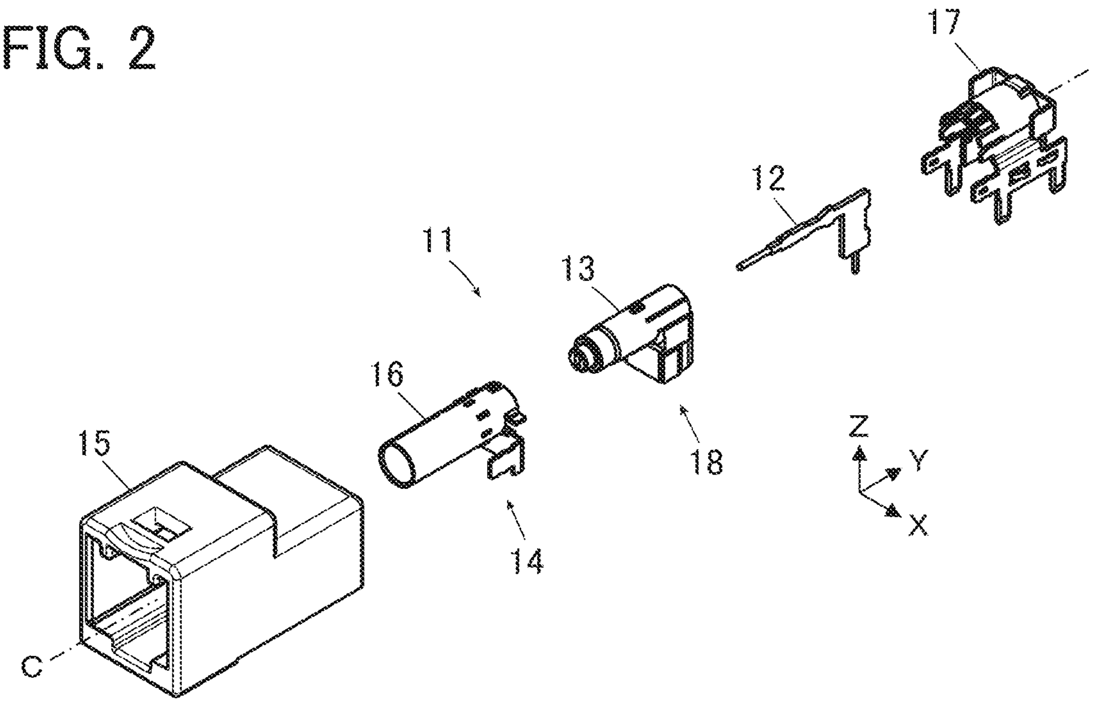
FIG. 2 is an assembly view of the angle-type coaxial connector according to Embodiment 1.

FIG. 2 shows an assembly view of the angle-type coaxial connector 11. Along the fitting axis C, a first shell 16 is disposed on the +Y direction side of the external insulator 15, the internal insulator 13 is disposed on the +Y direction side of the first shell 16, the contact 12 is disposed on the +Y direction side of the internal insulator 13, and a second shell 17 is disposed on the +Y direction side of the contact 12.

The internal insulator 13 and the external insulator 15 constitute an insulating housing 18 that retains the contact 12, while the first shell 16 and the second shell 17 constitute the conductive shell 14 that is retained by the housing 18 and surrounds the contact 12.

Figure 3:
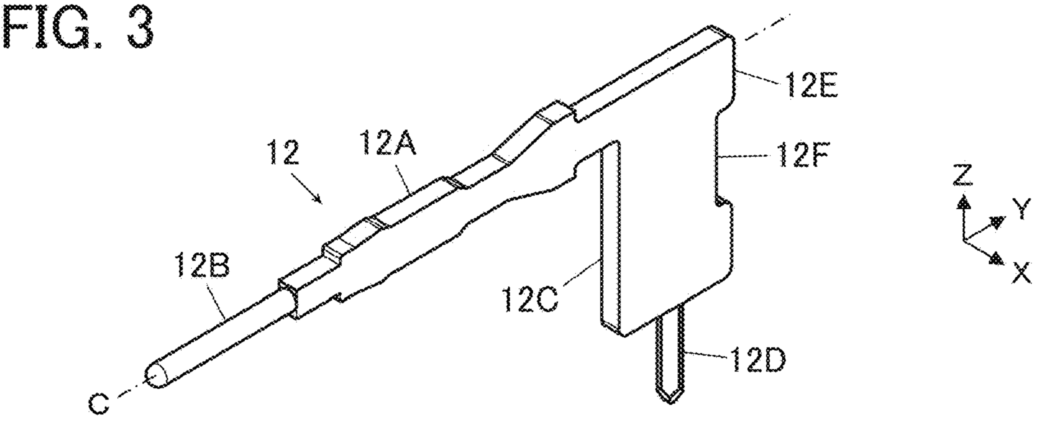
FIG. 3 is a perspective view showing a contact used in the angle-type coaxial connector according to Embodiment 1.

As shown in FIG. 3, the contact 12 is formed of a single metal sheet punched out in a substantially L shape and includes a press-fitting portion 12A linearly extending in the Y direction along the fitting axis C, a contacting portion 12B connected to a −Y directional tip of the press-fitting portion 12A, and a lead portion 12C connected to a +Y directional base end of the press-fitting portion 12A.

The contacting portion 12B has a round columnar shape linearly extending from the tip end of the press-fitting portion 12A in the −Y direction along the fitting axis C.

The lead portion 12C has a flat plate shape extending from the base end of the press-fitting portion 12A in the −Z direction orthogonal to the fitting axis C.

The contact 12 further includes a mounting portion 12D of pin shape protruding in the −Z direction from a −Z directional tip of the lead portion 12C.

A +Z directional and +Y directional end portion of the lead portion 12C is provided with a press-fitting force receiving surface 12E situated on the fitting axis C and facing in the +Y direction that is an opposite direction from the contacting portion 12B. The press-fitting force receiving surface 12E extends along an XZ plane orthogonal to the fitting axis C.

Here, the contact 12 is not formed by bending a metal sheet in an L shape but is formed of a metal sheet punched out in an L shape. Therefore, when a press-fitting force acting along the fitting axis C is applied to the press-fitting force receiving surface 12E situated on the fitting axis C, the contact 12 can be press-fitted into and retained by the housing 18. In order to allow the press-fitting force acting along the fitting axis C to be applied to the press-fitting force receiving surface 12E, it is desirable that the press-fitting force receiving surface 12E extends along an XZ plane orthogonal to the fitting axis C.

In addition, the contact 12 includes an impedance adjusting portion 12F disposed between the press-fitting force receiving surface 12E of the lead portion 12C and the mounting portion 12D. The impedance adjusting portion 12F is formed by cutting out, in the −Y direction, a Z directional intermediate part of an end surface, facing in the +Y direction, of the lead portion 12C at a position away from the fitting axis C in the −Z direction orthogonal to the fitting axis C.

Thus, the press-fitting force receiving surface 12E and the impedance adjusting portion 12F are disposed at positions different from each other in the Z direction orthogonal to the fitting axis C. Therefore, optimization of the shape of the press-fitting force receiving surface 12E for receiving a press-fitting force acting along the fitting axis C and optimization of the shape of the impedance adjusting portion 12F for matching characteristic impedance can be performed without interfering with each other.

Figure 4:
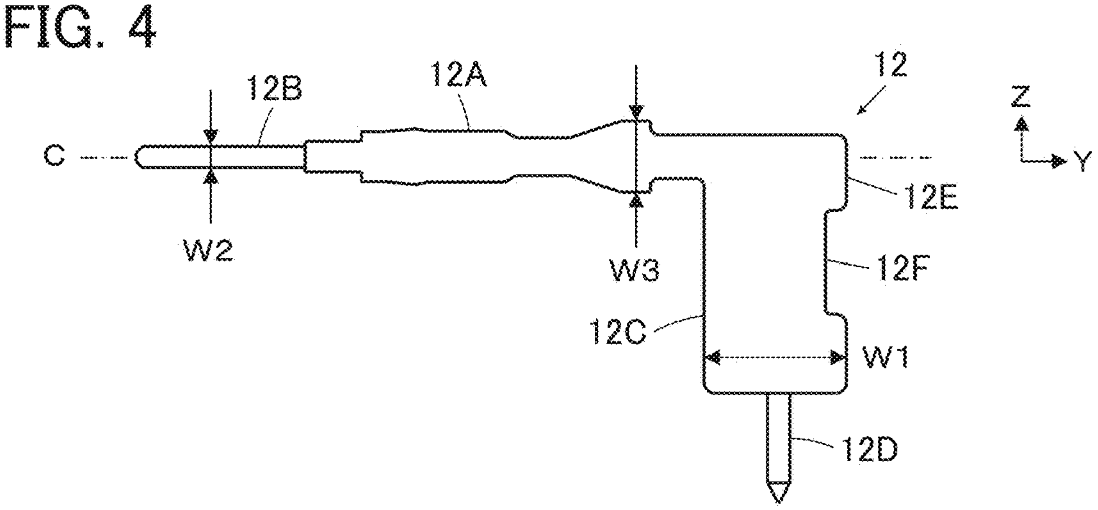
FIG. 4 is a side view showing the contact used in the angle-type coaxial connector according to Embodiment 1.

As shown in FIG. 4, a width W1 of the lead portion 12C in the Y direction orthogonal to the Z direction in which the lead portion 12C extends is set to be wider than a width W2 of the contacting portion 12B and a maximum width W3 of the press-fitting portion 12A in the Z direction orthogonal to the fitting axis C.

Figure 5:
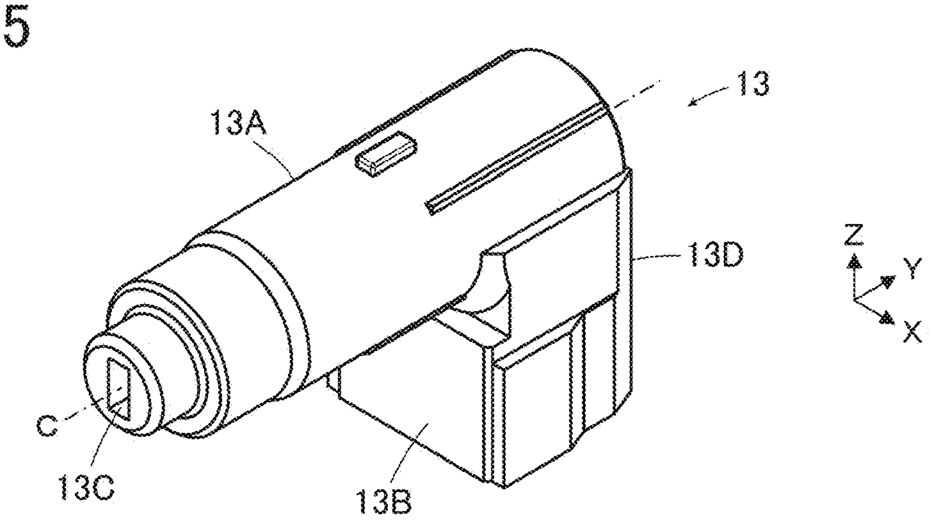
FIG. 5 is a perspective view showing an internal insulator used in the angle-type coaxial connector according to Embodiment 1.

As shown in FIG. 5, the internal insulator 13 includes a tubular portion 13A extending along the fitting axis C, and an orthogonally extending portion 13B extending from a +Y directional part of the tubular portion 13A in the −Z direction orthogonal to the fitting axis C.

Figure 6:
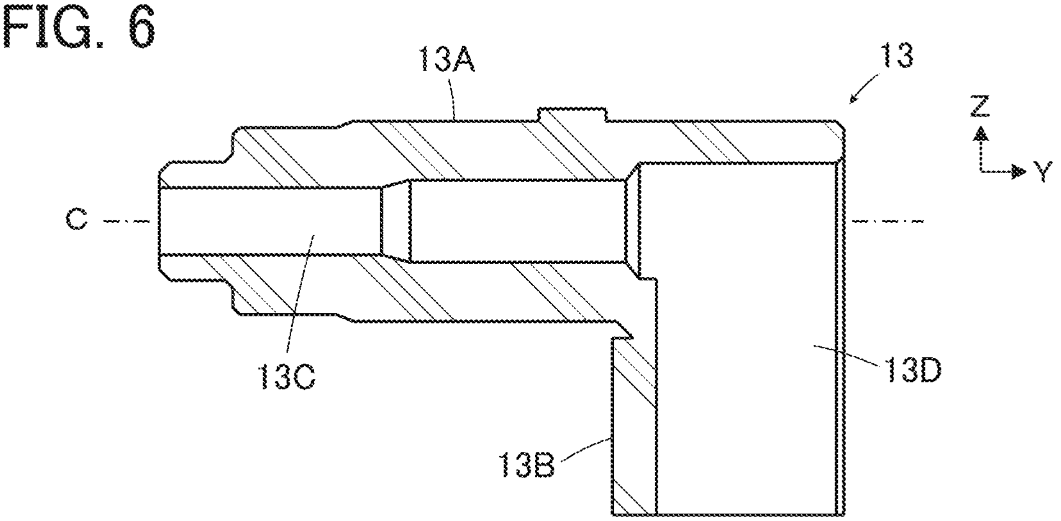
FIG. 6 is a cross-sectional view showing the internal insulator used in the angle-type coaxial connector according to Embodiment 1.

As shown in FIG. 6, the tubular portion 13A is provided with an insertion hole 13C which penetrates the internal insulator 13 along the fitting axis C and in which the press-fitting portion 12A of the contact 12 is to be inserted. The insertion hole 13C has a Z directional width slightly narrower than the maximum width W3 of the press-fitting portion 12A of the contact 12 shown in FIG. 4. In addition, a lead portion accommodating portion 13D of recess shape communicating with the insertion hole 13C and opening in the +Y direction and the −Z direction is formed in a +Y directional part of the tubular portion 13A and the orthogonally extending portion 13B.

Figure 7:
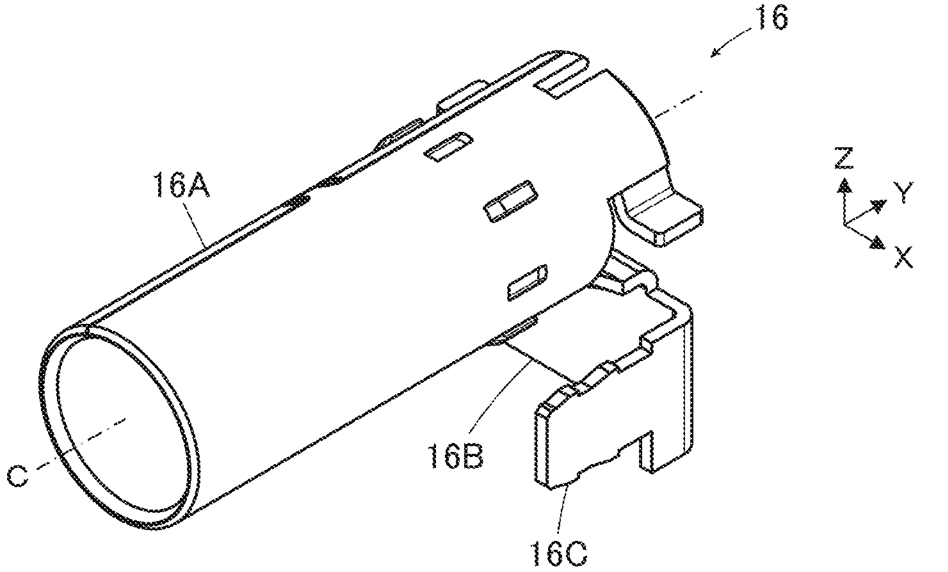
FIG. 7 is a perspective view showing a first shell used in the angle-type coaxial connector according to Embodiment 1.

As shown in FIG. 7, the first shell 16 is formed of a single metal sheet being bent and includes a cylindrical portion 16A extending along the fitting axis C, and a front plate portion 16B extending in the −Z direction along an XZ plane from a +Y directional end portion of the cylindrical portion 16A. A +X directional end portion of the front plate portion 16B is bent in the −Y direction and forms a fixing portion 16C extending in the −Y direction along a YZ plane. Although not shown in FIG. 7, as with the +X directional end portion of the front plate portion 16B, also a −X directional end portion thereof is bent in the −Y direction and forms another fixing portion 16C extending in the −Y direction along a YZ plane.

Figure 8:
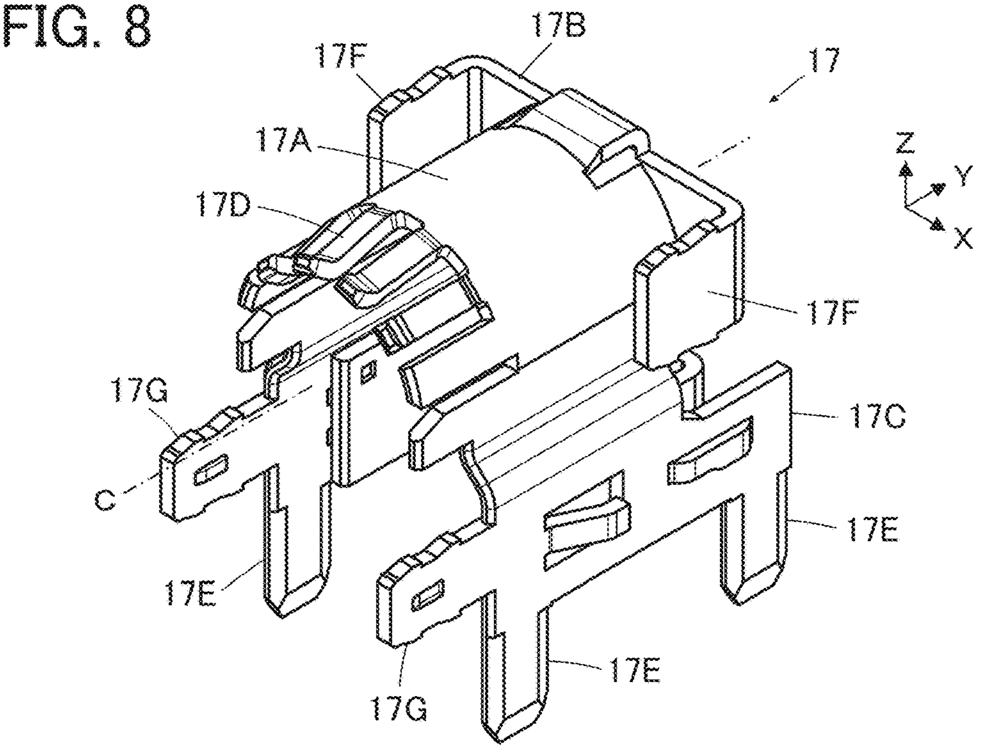
FIG. 8 is a perspective view showing a second shell used in the angle-type coaxial connector according to Embodiment 1.

As shown in FIG. 8, the second shell 17 is formed of a single metal sheet being bent and includes a curved portion 17A that forms part of a cylinder taking the fitting axis C as its center, a rear plate portion 17B that extends along an XZ plane so as to cover a +Y directional end portion of the curved portion 17A, and a pair of lateral plate portions 17C that extend in the −Z direction along a YZ plane separately from a +X directional end portion and a −X directional portion of the curved portion 17A.

A plurality of spring contacting portions 17D are formed to project on a −Y directional end portion of the curved portion 17A and extend in the −Y direction, while a plurality of shell mounting portions 17E are formed on a −Z directional end portion of each of the pair of lateral plate portions 17C to protrude in the −Z direction.

Further, a +X directional end portion and a −X directional end portion of the rear plate portion 17B are bent in the −Y direction and separately form fixing portions 17F extending in the −Y direction along a YZ plane. Similarly, −Y directional end portions of the pair of lateral plate portions 17C separately form fixing portions 17G protruding in the −Y direction along a YZ plane.

Figure 9:
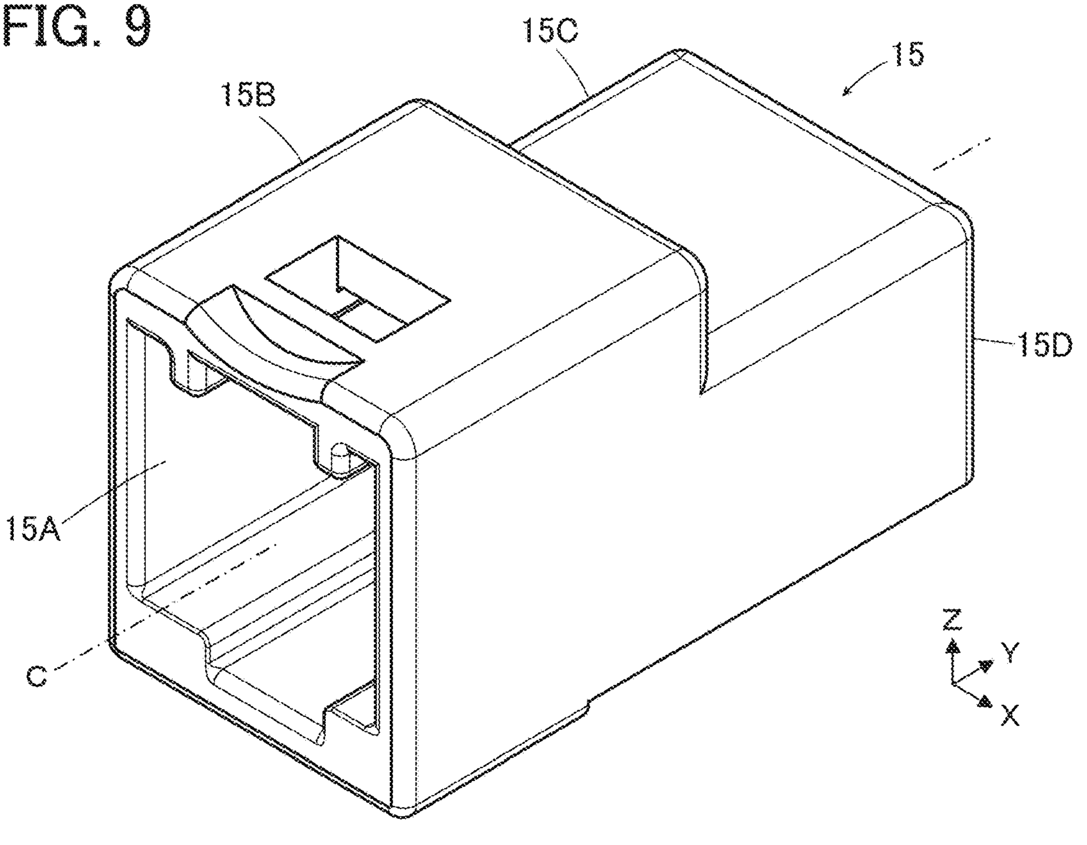
FIG. 9 is a perspective view showing an external insulator used in the angle-type coaxial connector according to Embodiment 1.

As shown in FIG. 9, the external insulator 15 includes a housing body portion 15B having a rectangular cuboid outer shape, and a rear cover portion 15C connected to a +Y directional end portion of the housing body portion 15B. The housing body portion 15B is provided in its interior with the counter connector accommodating portion 15A of recess shape opening in the −Y direction. The rear cover portion 15C is provided in its interior with a second shell accommodating portion 15D of recess shape communicating with the counter connector accommodating portion 15A and opening in the +Y direction and the −Z direction.

When the angle-type coaxial connector 11 is assembled, first, the contact 12 is moved in the −Y direction from the +Y direction toward the internal insulator 13, whereby the contact 12 is retained by the internal insulator 13. At this time, the contacting portion 12B and the press-fitting portion 12A of the contact 12 shown in FIG. 4 are inserted into the insertion hole 13C of the internal insulator 13 along the fitting axis C, and by means of a tool (not shown) for example, a force acting in the −Y direction is applied to the press-fitting force receiving surface 12E of the contact 12 situated on the fitting axis C, whereby the press-fitting portion 12A is press-fitted into the insertion hole 13C.

Here, unlike the bulging portions 1E and 2E of the upper contact 1 and the lower contact 2 of JP 2023-77187 A described above, the impedance adjusting portion 12F of the contact 12 does not bulge in the +Y direction from the end surface, facing in the +Y direction, of the lead portion 12C but is formed by cutting out, in the −Y direction, the Z directional intermediate part of the end surface, facing in the +Y direction, of the lead portion 12C. Therefore, without interference of the impedance adjusting portion 12F, a force acting in the −Y direction is applied to the press-fitting force receiving surface 12E by means of a tool (not shown), whereby the press-fitting portion 12A can be press-fitted into the insertion hole 13C.

In addition, since the press-fitting force receiving surface 12E of the contact 12 is situated on the fitting axis C and extends along an XZ plane orthogonal to the fitting axis C, by application of a force acting in the −Y direction to the press-fitting force receiving surface 12E, the press-fitting can be stably performed.

When a −Y directional end portion of the lead portion 12C shown in FIG. 4 abuts an inner wall surface of the orthogonally extending portion 13B situated on a −Y directional end portion of the lead portion accommodating portion 13D of the internal insulator 13 shown in FIG. 6, the operation of press-fitting of the press-fitting portion 12A into the insertion hole 13C is completed. The contacting portion 12B of the contact 12 protrudes in the −Y direction from the insertion hole 13C of the internal insulator 13.

Next, the first shell 16 is moved in the −Y direction from the +Y direction toward the external insulator 15, and the fixing portion 16C of the first shell 16 shown in FIG. 7 is press-fitted into a fixed portion (not shown) inside the external insulator 15, whereby the first shell 16 is retained by the external insulator 15.

When the internal insulator 13 that retains the contact 12 is moved from the +Y direction toward the −Y direction with respect to the first shell 16 thus retained in the external insulator 15, the tubular portion 13A of the internal insulator 13 shown in FIG. 5 is inserted into the cylindrical portion 16A of the first shell 16 shown in FIG. 7, and the orthogonally extending portion 13B of the internal insulator 13 is situated on the +Y direction side of the front plate portion 16B of the first shell 16.

Further, when the second shell 17 is moved from the +Y direction toward the −Y direction with respect to the first shell 16, the +Y directional part of the tubular portion 13A and the orthogonally extending portion 13B of the internal insulator 13 and a +Y directional end portion of the first shell 16 are covered with the second shell 17. When the pair of fixing portions 17F and the pair of fixing portions 17G are press-fitted into the fixed portion (not shown) inside the external insulator 15, the second shell 17 is retained by the external insulator 15, whereby the assembling operation of the angle-type coaxial connector 11 is completed.

Figure 10:
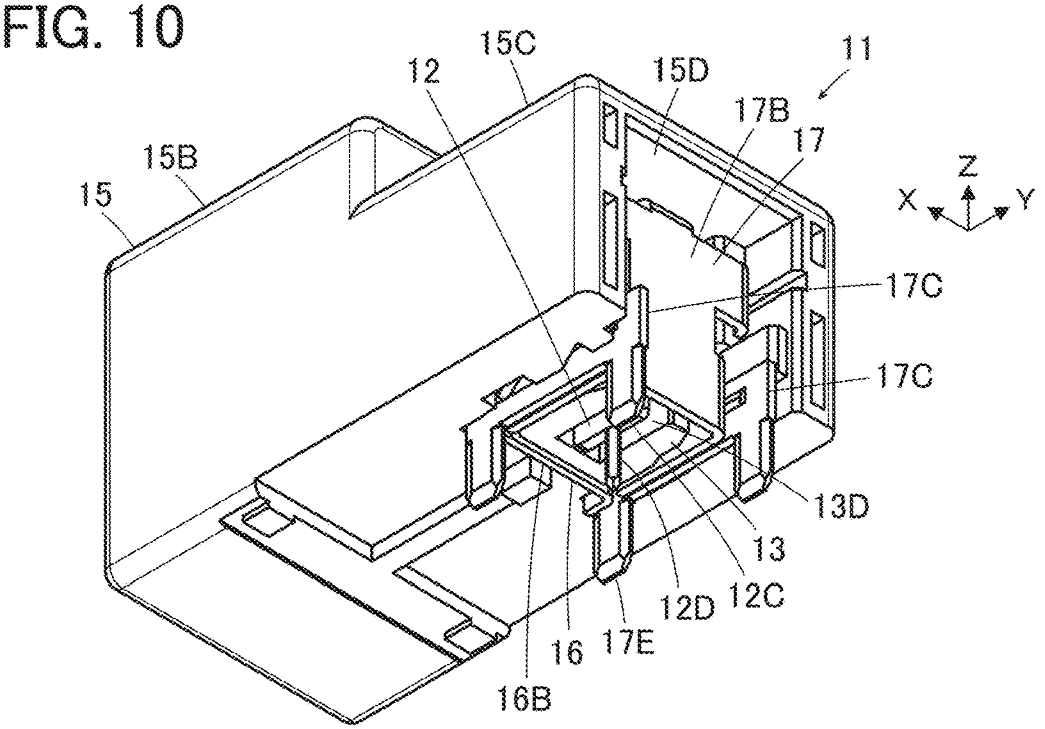
FIG. 10 is a perspective view showing the angle-type coaxial connector according to Embodiment 1 when viewed from an obliquely lower position.

FIG. 10 shows a perspective view of the thus-assembled angle-type coaxial connector 11 when viewed from an obliquely lower position. The lead portion 12C of the contact 12 is accommodated in the lead portion accommodating portion 13D of the internal insulator 13 and surrounded by the front plate portion 16B of the first shell 16 and the rear plate portion 17B and the pair of lateral plate portions 17C of the second shell 17.

In addition, the mounting portion 12D of the contact 12 and the plurality of shell mounting portions 17E of the second shell 17 protrude from the external insulator 15 in the −Z direction.

Figure 11:
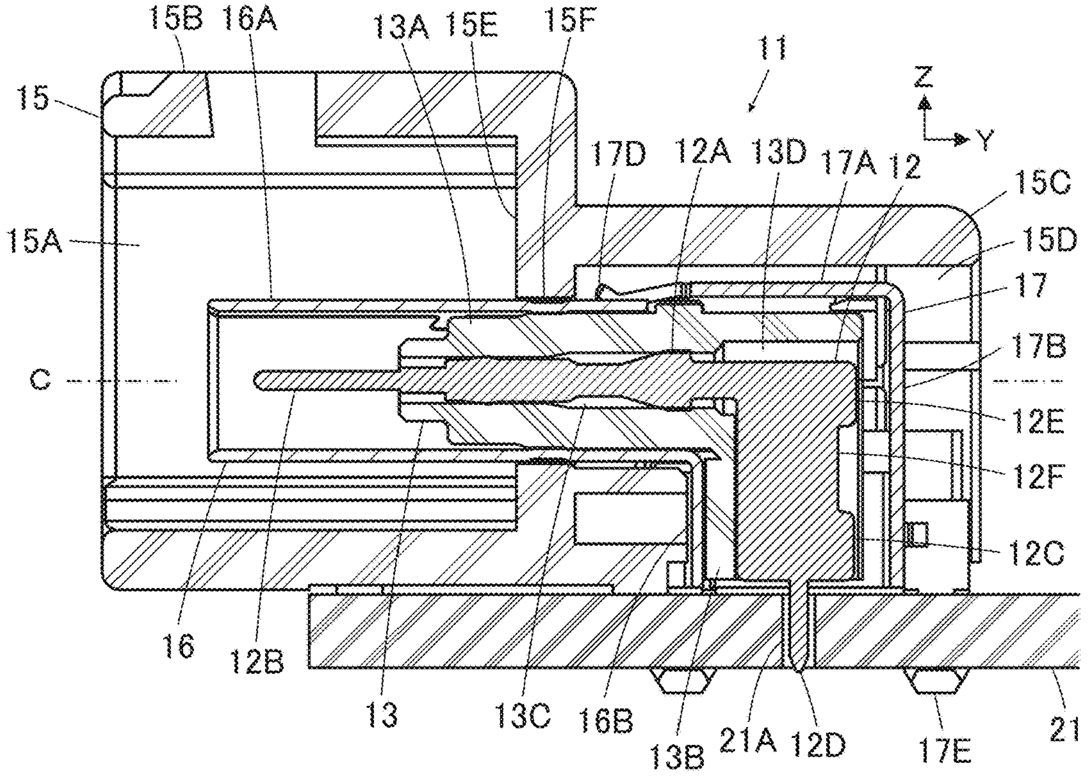
FIG. 11 is a cross-sectional view taken along line A-A in FIG. 1.

FIG. 11 shows a cross-sectional view of the angle-type coaxial connector 11 mounted on the substrate 21. The cylindrical portion 16A of the first shell 16 extends from the second shell accommodating portion 15D of the rear cover portion 15C to the counter connector accommodating portion 15A of the housing body portion 15B through a through-hole 15F formed in a partition wall portion 15E that is situated at a boundary between the housing body portion 15B and the rear cover portion 15C of the external insulator 15 and extends along an XZ plane.

The contact 12 is surrounded by the cylindrical portion 16A and the front plate portion 16B of the first shell 16 and the curved portion 17A, the rear plate portion 17B, and the pair of lateral plate portions 17C shown in FIG. 10 of the second shell 17 with the press-fitting portion 12A being inserted in the insertion hole 13C of the internal insulator 13 and the lead portion 12C being accommodated in the lead portion accommodating portion 13D of the internal insulator 13.

The plurality of spring contacting portions 17D elastically make contact with an outer peripheral surface of the cylindrical portion 16A of the first shell 16, whereby the second shell 17 is electrically connected to the first shell 16.

The substrate 21 has a through-hole 21A that corresponds to the mounting portion 12D of the contact 12, the through-hole 21A penetrating the substrate 21 in the Z direction and having an inner wall surface that is provided with a conductive layer such as a plating layer. The mounting portion 12D of the contact 12 is passed through the through-hole 21A and soldered, thereby being electrically connected to a wiring layer (not shown) of the substrate 21 connected to the through-hole 21A.

Similarly, the substrate 21 has a plurality of through-holes separately corresponding to the plurality of shell mounting portions 17E of the second shell 17, and each shell mounting portion 17E is passed through the corresponding through-hole of the substrate 21 and soldered, thereby being electrically connected to a ground layer (not shown) of the substrate 12 connected to the through hole.

The lead portion 12C of the contact 12 includes the impedance adjusting portion 12F formed by cutting out the Z directional intermediate part of the end surface, facing in the +Y direction, of the lead portion 12C. Therefore, characteristic impedance in the lead portion 12C can be adjusted by selecting the Y directional depth and the Z directional length of the cutout in the impedance adjusting portion 12F, signal transmission characteristics can be improved, and high-speed transmission can be stably performed.

The contact 12 is formed of a metal sheet punched out in an L shape, and includes the impedance adjusting portion 12F formed by cutting out, in the −Y direction, the end surface, facing in the +Y direction, of the lead portion 12C at a position away from the fitting axis C in the −Z direction. Therefore, without interference of the impedance adjusting portion 12F, the press-fitting portion 12A can be press-fitted into the insertion hole 13C of the internal insulator 13 by applying a press-fitting force acting along the fitting axis C to the press-fitting force receiving surface 12E situated on the fitting axis C, so that the angle-type coaxial connector 11 can be easily assembled.

In addition, since the press-fitting force receiving surface 12E and the impedance adjusting portion 12F of the contact 12 are disposed at positions different from each other in the Z direction orthogonal to the fitting axis C, optimization of the shape of the press-fitting force receiving surface 12E and optimization of the shape of the impedance adjusting portion 12F can be performed without interfering with each other.

In other words, it is possible to achieve both adjustment of the characteristic impedance and facilitation of assembling of the angle-type coaxial connector 11.

While the shell 14 that surrounds the internal insulator 13 is constituted of the two parts, i.e., the first shell 16 and the second shell 17 in Embodiment 1 above, the invention is not limited thereto, and also a shell constituted of a single part can surround the internal insulator 13.

However, when the first shell 16 and the second shell 17 constitute the shell 14 as in Embodiment 1, the angle-type coaxial connector 11 can be efficiently assembled.

Similarly, while the housing 18 that retains the contact 12 is constituted of the two parts, i.e., the internal insulator 13 and the external insulator 15 in Embodiment 1 described above, the invention is not limited thereto, and the contact 12 can be retained by a housing constituted of a single part.

However, when the internal insulator 13 and the external insulator 15 constitute the housing 18 as in Embodiment 1, the angle-type coaxial connector 11 can be efficiently assembled.

While the lead portion 12C of the contact 12 extends from the base end of the press-fitting portion 12A toward the −Z direction orthogonal to the fitting axis C in Embodiment 1 described above, the lead portion 12C is not limited to extending in the direction orthogonal to the fitting axis C, but it suffices if the lead portion 12C extends in a direction intersecting the fitting direction C.

Embodiment 2

While the present invention is applied to a coaxial connector to configure the angle-type coaxial connector 11 in Embodiment 1 described above, the invention is not limited thereto.

Figure 12:
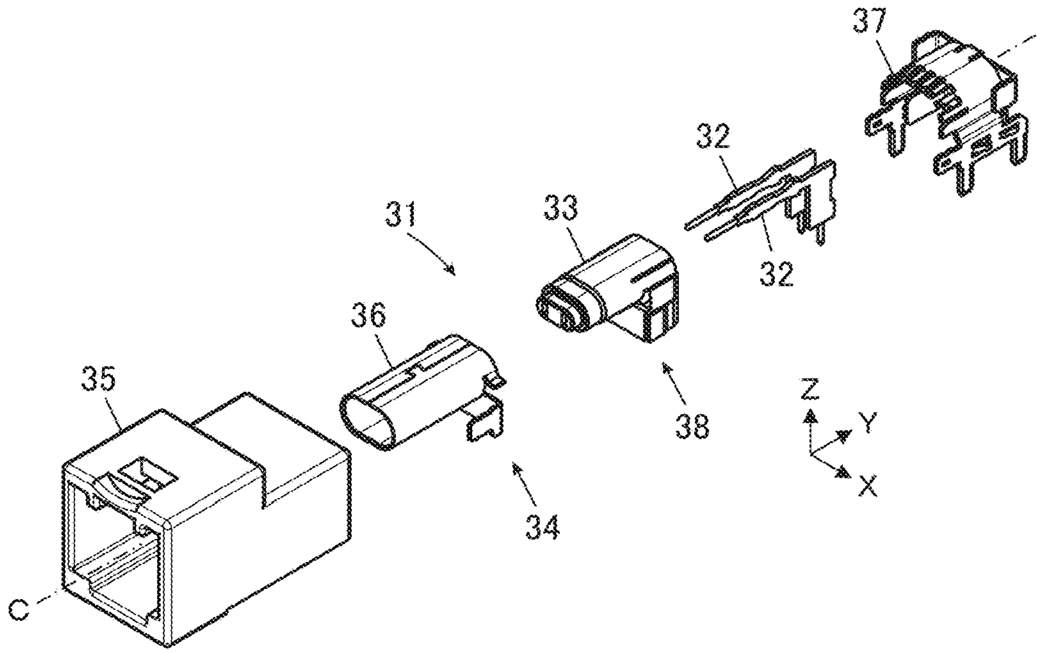
FIG. 12 is an assembly view of an angle-type differential signal connector according to Embodiment 2.
Figure 13:
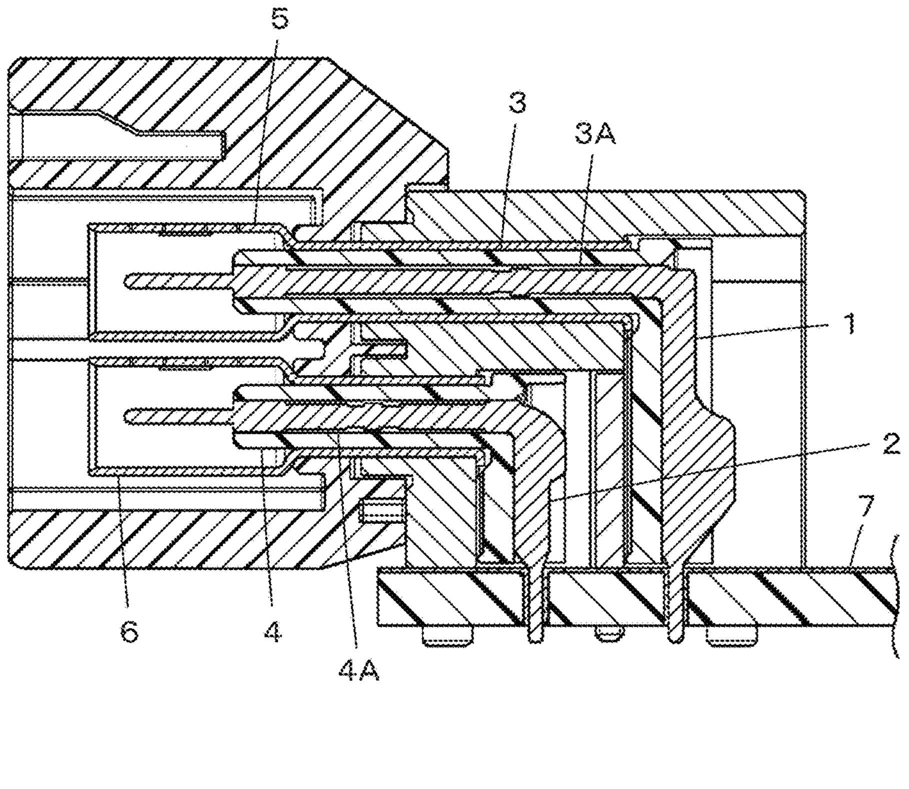
FIG. 13 PRIOR ART
FIG. 13 is a cross-sectional view showing a conventional angle-type connector.
Figure 14:
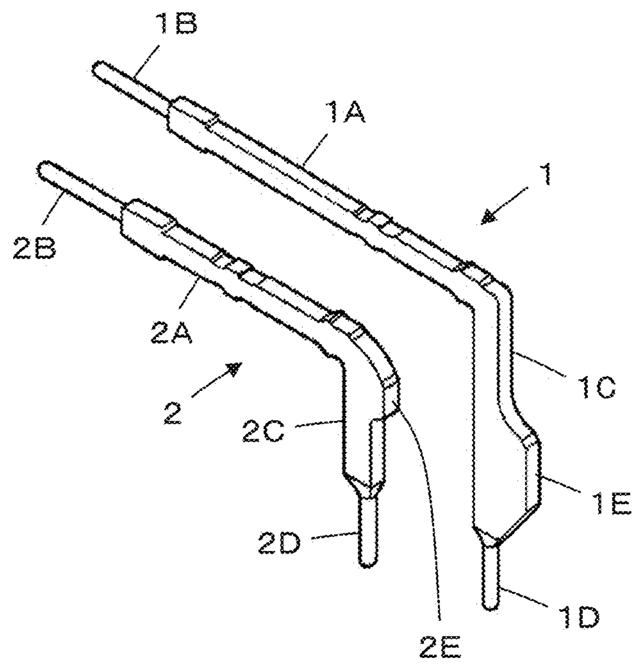
FIG. 14 PRIOR ART
FIG. 14 is a perspective view showing an upper contact and a lower contact used in the conventional angle-type connector.

FIG. 12 shows an assembly view of an angle-type differential signal connector 31 according to Embodiment 2. Along the fitting axis C, a first shell 36 is disposed on the +Y direction side of an external insulator 35, an internal insulator 33 is disposed on the +Y direction side of the first shell 36, a pair of contacts 32 are disposed on the +Y direction side of the internal insulator 33, and a second shell 37 is disposed on the +Y direction side of the pair of contacts 32.

The internal insulator 33 and the external insulator 35 constitute an insulating housing 38 that retains the pair of contacts 32, while the first shell 36 and the second shell 37 constitute a conductive shell 34 that is retained by the housing 38 and surrounds the pair of contacts 32.

The pair of contacts 32 are used to transmit a differential signal and configured to be retained by the internal insulator 33 with a predetermined interval therebetween in the X direction.

Each of the pair of contacts 32 has the same structure as that of the contact 12 in Embodiment 1 shown in FIGS. 3 and 4. In other words, the contact 32 is formed of a single metal sheet punched out in a substantially L shape and includes a press-fitting portion linearly extending in the Y direction along the fitting axis C, a contacting portion connected to a −Y directional tip of the press-fitting portion, a lead portion connected to a +Y directional base end of the press-fitting portion, and a mounting portion protruding in the −Z direction from a −Z directional tip of the lead portion.

Further, as with the contact 12 in Embodiment 1, a +Y directional end portion of the lead portion of the contact 32 is provided with a press-fitting force receiving surface situated on the fitting axis C and facing in the +Y direction and an impedance adjusting portion situated away from the fitting axis C in the −Z direction and formed by cutting out the +Y directional end portion of the contact 32 in the −Y direction.

When the angle-type differential signal connector 31 is assembled, as with the angle-type coaxial connector 11 of Embodiment 1, first, the pair of contacts 32 are retained by the internal insulator 33. Next, the first shell 36 is retained by the external insulator 35, and the internal insulator 33 that retains the pair of contacts 32 is covered with the first shell 36 and the second shell 37, whereby the angle-type differential signal connector 31 is assembled.

Here, since each of the pair of contacts 32 includes, at the position away from the fitting axis C in the −Z direction, the impedance adjusting portion formed by cutting out the +Y directional end portion of the lead portion in the −Y direction, without interference of the impedance adjusting portion, the contact 32 can be press-fitted into and retained by the internal insulator 33 by applying a force acting along the fitting axis C to the press-fitting force receiving surface situated on the fixing axis C, so that the angle-type differential signal connector 31 can be easily assembled.

Thus, when the present invention is applied to a differential signal connector, the angle-type differential signal connector 31 that can achieve both adjustment of characteristic impedance and facilitation of assembling is configured.

While the shell 34 that surrounds the internal insulator 33 is constituted of the two parts, i.e., the first shell 36 and the second shell 37 also in Embodiment 2, the invention is not limited thereto, and also a shell constituted of a single part can surround the internal insulator 33.

In addition, while the housing 38 that retains the pair of contacts 32 is composed of the two parts, i.e., the internal insulator 33 and the external insulator 35, the invention is not limited thereto, and the pair of contacts 32 can be retained by a housing constituted of a single part.

What is claimed is:

1. An angle-type connector to be fitted to a counter connector along a fitting axis, the angle-type connector comprising:

at least one contact made of a metal sheet punched out in an L shape;

a housing that has an insulating property and retains the at least one contact; and a shell that has a conductive property, is retained by the housing, and surrounds the at least one contact, wherein each of the at least one contact includes a press-fitting portion that linearly extends along the fitting axis and is press-fitted into the housing, a contacting portion that linearly extends along the fitting axis from a tip end of the press-fitting portion and is to be connected to a counter contact of the counter connector when the angle-type connector is fitted to the counter connector, a lead portion extending from a base end of the press-fitting portion along an intersecting direction intersecting the fitting axis, and a mounting portion protruding from a tip of the lead portion in the intersecting direction, a width of the lead portion in a direction orthogonal to the intersecting direction is wider than a width of the contacting portion and a width of the press-fitting portion in a direction orthogonal to the fitting axis, the lead portion includes a press-fitting force receiving surface situated on the fitting axis and facing in an opposite direction from the contacting portion, and each of the at least one contact includes an impedance adjusting portion situated between the press-fitting force receiving surface and the mounting portion and formed by cutting out, in a direction along the fitting axis, part of the lead portion at a position away from the fitting axis in a direction orthogonal to the fitting axis.

2. The angle-type connector according to claim 1, wherein the impedance adjusting portion is formed by cutting out an intermediate portion in the intersecting direction of an end surface of the lead portion, the end surface facing in an opposite direction from the contacting portion.

3. The angle-type connector according to claim 1, wherein the press-fitting force receiving surface is orthogonal to the fitting axis.

4. The angle-type connector according to claim 1, wherein the housing includes an internal insulator and an external insulator, the internal insulator surrounds the press-fitting portion and the lead portion of the at least one contact, the shell surrounds the internal insulator, and the external insulator surrounds the shell.

5. The angle-type connector according to claim 4, wherein the internal insulator includes an insertion hole penetrating the internal insulator along the fitting axis, and a lead portion accommodating portion of recess shape communicating with the insertion hole and facing in an opposite direction from the contacting portion of the at least one contact, and the lead portion of the at least one contact is accommodated in the lead portion accommodating portion of the internal insulator.

6. The angle-type connector according to claim 4, wherein the shell includes a first shell surrounding the contacting portion and the press-fitting portion of the at least one contact, and a second shell surrounding the lead portion of the at least one contact and electrically connected to the first shell.

7. The angle-type connector according to claim 4, wherein the intersecting direction is a direction orthogonal to the fitting axis.

8. The angle-type connector according to claim 4, comprising one contact as the at least one contact, wherein the angle-type connector is used as a coaxial connector.

9. The angle-type connector according to claim 4, comprising, as the at least one contact, a pair of contacts for transmitting differential signals, wherein the angle-type connector is used as a differential signal connector.

* * * * *